No. 776,818. PATENTED DEC. 6, 1904.
A. M. WARD.
SCREW LOCK FOR EYEGLASSES.
APPLICATION FILED JUNE 4, 1904.
NO MODEL.
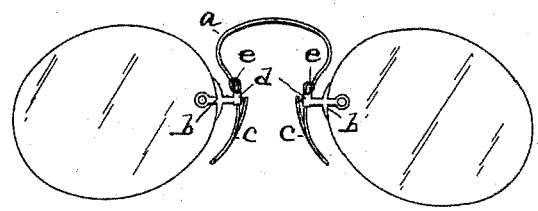
Fig.1.
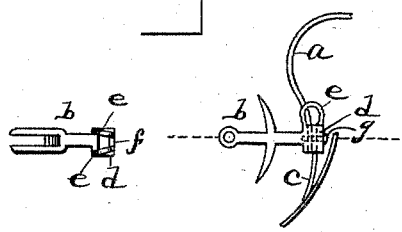 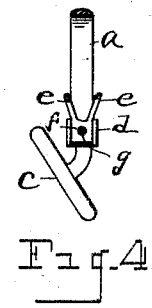
Fig.2.   Fig.3.   Fig.4.
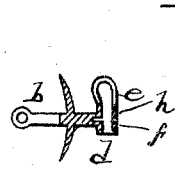 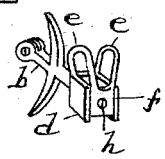 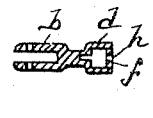
Fig.5.   Fig.6.   Fig.7.
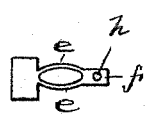
Fig.8.
Witnesses:
O. B. Baenziger.
M. L. Simmons.
Albert M. Ward
Inventor
By his Attorney
Newell S. Wright.

No. 776,818. Patented December 6, 1904.

UNITED STATES PATENT OFFICE.

ALBERT M. WARD, OF DETROIT, MICHIGAN, ASSIGNOR TO GEORGE JOHNSTON, OF DETROIT, MICHIGAN.

SCREW-LOCK FOR EYEGLASSES.

SPECIFICATION forming part of Letters Patent No. 776,818, dated December 6, 1904.

Application filed June 4, 1904. Serial No. 211,157. (No model.)

*To all whom it may concern:*

Be it known that I, ALBERT M. WARD, a citizen of the United States, residing at Detroit, county of Wayne, State of Michigan, have invented a certain new and useful Improvement in Screw-Locks for Eyeglasses, of which the following is a specification, reference being had to the accompanying drawings, which form a part of this specification.

My invention is designed to provide a novel screw-lock for eyeglasses, my invention having for its object to prevent the stud-screws, whereby the spring and guards of eyeglasses are held in place, from working loose, said screws being held rigidly in place, so that the parts will be held from wabbling.

My invention is also designed to provide a stud-screw lock which shall be neat and attractive in appearance and simple and economical in construction, as well as of superior utility.

To these ends my invention consists of the construction, combination, and arrangement of devices hereinafter described and claimed, and illustrated in the accompanying drawings, in which—

Figure 1 is a view in elevation of a pair of eyeglasses to which my invention is applied. Fig. 2 is a detail view of the attaching-post in plan. Fig. 3 is a detail view in elevation, showing my invention on an enlarged scale. Fig. 4 is also a detail view in side elevation. Fig. 5 is also a detail view in section longitudinally through the post and screw-lock. Fig. 6 is a view in perspective, illustrating my invention. Fig. 7 is a view in section at right angles to that illustrated in Fig. 5. Fig. 8 is a detail view of the blank from which certain parts are constructed.

More particularly, my invention is designed as an improvement upon the screw-lock embodied in an application filed by me February 1, 1904, Serial No. 191,517.

Heretofore, as pointed out in my application above referred to and as is well understood, there has been a tendency for the spring and nose-guard to loosen the screw by which the spring and guards are attached to the stud or post engaged upon the eyeglasses.

In the drawings, $a$ represents the spring connecting the eyeglasses, and $b\ b$ denote the studs mounted upon the eyeglasses and upon the inner ends of which the extremities of the spring $a$ are attached. The nose-guards are indicated at $c\ c$ and may be of any desired construction, the supporting-arm of the nose-guard being also secured upon the corresponding attaching-post $b$.

My present invention has reference particularly to the construction of the attaching-posts $b$, my invention having reference more especially also to the particular construction of the ends of said posts whereupon the corresponding nose-guard and the adjacent extremity of the spring are secured. Accordingly I mount upon the inner end of each attaching-post a box or inclosure $d$, formed, essentially, of two sides and a base, as shown, and from which and preferably from the base of which project two spring-arms $e\ e$, said arms being bent over and carrying a yielding washer $f$, the washer projecting into the outer end of the box, as shown. The box is open at the top and bottom to receive the adjacent extremities of the corresponding guard and spring, a screw $g$ passed through the washer and into the post through the nose-guard and spring holding the parts in place. The end of the spring enters the box between the spring-arms $e\ e$, the washer being perforated, as indicated at $h$, to receive the attaching stud or screw $g$. By forming the springs $e\ e$ as shown, leading from the base of the box at opposite sides thereof upward and over, so as to carry the washer into the outer end of the box, provision is effectually made by the bent portions of the arms to effectually brace the spring, so that it cannot move in any manner when secured in place. I prefer that the washer-arms $e$ shall also be bent laterally, as shown, to give ample room for the entrance of the spring into place. It will be seen thus that the spring $a$ is not only held by the screw $g$, but is also held by contacting with the looped portion of the arms above the attaching-screw, so that the spring really is engaged at various points, the washer $f$ intervening between the head of the screw and the adjacent part. I have shown underneath the washer first the arm of the nose-guard and then the extremity of the spring; but I do not limit myself solely to this special arrangement of the spring-arm and the nose-guard; but this construction by which I am enabled to hold the spring from lateral movement by having its edges contacting with the looped arms *e e* at a little distance from the attaching-screw is a feature of considerable importance in holding the spring rigidly and immovably in place.

The box *d*, with the yielding arms *e e* and washer *h*, may be constructed of a single piece of sheet metal and secured in any suitable manner upon the end of the post, as by soldering the same thereupon.

The blank formed from sheet metal from which the box, the washer, and the connecting-arms are constructed is indicated in Fig. 8.

I do not limit myself to connecting the arms with a base to the box; but such a construction gives a longer loop, allowing more freedom of movement to the washer.

What I claim as my invention is—

1. A screw-lock for eyeglasses provided with a connecting-spring, comprising in combination an attaching stud or post having a washer connected therewith by two intervening yielding arms forming a loop therebetween, and arranged on opposite sides of the spring.

2. A screw-lock for eyeglasses, comprising in combination an attaching-stud having a washer connected therewith by two intervening oppositely-arranged yielding arms forming a loop therebetween, and the washer at the end thereof opposite said stud being free.

3. A screw-lock for eyeglasses provided with a connecting-spring comprising in combination an attaching stud or post having a washer connected therewith by two intervening yielding arms, said arms oppositely arranged and forming a loop therebetween.

4. A screw-lock for eyeglasses, comprising an attaching stud or post having a box at its free extremity formed with two sides and a base and open at the two ends thereof, and a washer connected therewith by two intervening yielding arms projecting from the base of the box and bent over to carry the washer into the outer end of the box, said arms forming a loop therebetween.

5. A screw-lock for eyeglasses provided with a connecting-spring, comprising an attaching stud or post having a washer connected therewith by intervening looped yielding arms oppositely arranged, the extremity of the spring passed between said yielding arms.

6. A screw-lock for eyeglasses provided with a connecting-spring, comprising an attaching-stud provided with a box at its outer end having a washer connected therewith by intervening yielding arms, said arms projecting from the opposite sides of the post of the box and bent forward to carry the washer into the open end of the box, the spring passed between the looped arms and having its edges contacting on opposite sides with the corresponding arms, said arms forming bearings on opposite edges of the spring.

7. In combination a recessed attaching stud or post for eyeglasses having a washer located in the recess of the post and connected with the post by intervening yielding arms, a spring engaged in the recess of the post between said arms, a nose-guard secured in the recessed post, and a screw passed through said washer and the adjacent extremities of the nose-guard and the spring into the post to secure the spring and nose-guard upon the post.

In testimony whereof I have signed this specification in the presence of two subscribing witnesses.

ALBERT M. WARD.

Witnesses:
N. S. WRIGHT,
M. L. SIMMONS.